United States Patent
Daoud et al.

(10) Patent No.: US 12,279,112 B2
(45) Date of Patent: Apr. 15, 2025

(54) WIRELESS CONNECTION INFORMATION GENERATION, DISTRIBUTION, AND USE

(71) Applicant: Charter Communications Operating, LLC, St. Louis, MO (US)

(72) Inventors: Mohamed Daoud, Englewood, CO (US); Muhammad J. Khan, Greenwood Village, CO (US); Hany A. Heikal, Aurora, CO (US); Hossam H. Hmimy, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 418 days.

(21) Appl. No.: 17/572,118

(22) Filed: Jan. 10, 2022

(65) Prior Publication Data

US 2023/0224705 A1 Jul. 13, 2023

(51) Int. Cl.
*H04W 12/06* (2021.01)
*H04W 12/40* (2021.01)
*H04W 72/51* (2023.01)

(52) U.S. Cl.
CPC ......... *H04W 12/068* (2021.01); *H04W 12/40* (2021.01); *H04W 72/51* (2023.01)

(58) Field of Classification Search
CPC ... H04W 12/068; H04W 12/40; H04W 72/51; H04W 12/06; H04W 12/43; H04L 63/0853
See application file for complete search history.

(56) References Cited

U.S. PATENT DOCUMENTS

| | | | | |
|---|---|---|---|---|
| 6,856,800 B1* | 2/2005 | Henry | ............... | H04W 12/069 455/410 |
| 2022/0217525 A1* | 7/2022 | Prayaga | ............... | H04W 8/26 |
| 2023/0011447 A1* | 1/2023 | Gundavelli | ............... | H04W 8/205 |
| 2023/0189001 A1* | 6/2023 | Dees | ............... | H04W 8/205 455/411 |
| 2023/0337002 A1* | 10/2023 | Hu | ............... | H04W 12/37 |

* cited by examiner

*Primary Examiner* — Mazda Sabouri
(74) *Attorney, Agent, or Firm* — Armis IP Law, LLC

(57) ABSTRACT

According to one configuration, a communication management resource such as a SIM provisioning platform receives input from a mobile communication device to activate use of the mobile communication device in a private wireless network. The communication management resource authenticates use of the mobile communication device in the private wireless network. Subsequent to authentication, the communication management resource populates an access file such as private SIM (Subscriber Identity Module) information for use by the mobile communication device to access the private wireless network. The access file is populated with information such as a unique cell identifier value, encryption information, identification of supported services, etc. The communication management resource communicates the newly generated access file (such as SIM information) to the mobile communication device, enabling the mobile communication device use of the private wireless network.

28 Claims, 9 Drawing Sheets

WIRELESS CONNECTION INFORMATION GENERATION, DISTRIBUTION, AND USE

BACKGROUND

A subscriber identity module or subscriber identification module (SIM), also known a SIM card, is an integrated circuit that is used to securely store information such as the international mobile subscriber identity (IMSI) telephony number and its related key information. Such information is used to identify and authenticate subscribers on mobile communication devices when they use a respective wireless network.

A conventional SIM circuit is part of the function of a Universal Integrated Circuit Card (UICC) physical smart card, which is usually fabricated from a plastic material embedded with contacts and a corresponding semiconductor circuit. Conventional SIM information in a SIM card is transferable between different mobile devices.

A conventional SIM card stores subscriber information such as a unique serial number (ICCID), international mobile subscriber identity (IMSI) number, security authentication and ciphering information, temporary information related to the local network, a list of the services the user has access to, and two passwords such as a personal identification number (PIN) for ordinary use, and a personal unblocking key (PUK) for PIN unlocking.

Newer SIM technology supports so-called embedded SIM information. For example, a conventional embedded-SIM (eSIM) or embedded universal integrated circuit card (eUICC) is a form of programmable SIM card that is embedded directly into a mobile communication device.

BRIEF DESCRIPTION OF EMBODIMENTS

This disclosure includes the observation that private wireless networks are often designed and architected for specific purposes and related groups of users. Factories, enterprises, warehouses, schools are prime examples of entities that leverage private wireless networks. Most private wireless networks are cellular and are based on LTE (Long Term Evolution) and 5G technologies. LTE and 5G have strong security measures to activate devices and add them to the network; this typically happens through physical SIM cards and eSIM's.

As previously discussed, eSIM (embedded SIM sometimes referred to as eUICC) technology allows mobile users to download a carrier profile and activate a carrier's service without having a physical SIM card. It's a global specification driven by the GSMA that enables Remote SIM Provisioning (RSP) of any mobile device.

This disclosure further includes the observation that there are deficiencies associated with conventional techniques of supporting wireless communications using standard SIM cards and distribution of standard eSIM information. Certain embodiments herein include newly adding and activation of mobile communication devices to private wireless networks (such as implementing LTE, 5G, etc.) for eSIM's and pushing of the user's information from the enterprise's federated identity management system (i.e., such as via Outlook™ or any similar SIM information distribution system) to build a subscriber profile in the HSS or 5G core.

Specifically, embodiments herein include multiple ways of adding and activating devices on a network using eSIM. For example, one implementation as discussed herein includes a private wireless network operator providing a QR code or other information to the end user. The end user of the mobile communication device scans the QR code or other information with the mobile communication device being authenticated. The device then device contacts a communication management resource such as a SIM Provisioning Platform-Subscription Manager-Data Preparation (SM-DP+). The mobile communication device communicates the scanned information (or other suitable information) to the platform to retrieve and download an appropriate eSIM profile enabling the device and corresponding user access to a respective private wireless network.

Another implementation as discussed herein includes the user manually entering the eSIM information (SM-DP+ address, activation code, etc.) in a respective settings page displayed on a respective user device; the device then contacts the communication management resource such as SM-DP+ server (platform) for SIM activation.

In both such cases, subscriber profile information (such as complementary information with respect to the SIM information provided to the mobile communication device) is pre-added in a corresponding HSS (Home Subscriber Server) or 5G core associated with the private wireless network. The home subscriber server (HSS), or user profile server function (UPSF), is a master user database that supports the IMS network entities that actually handle calls. It contains the subscription-related information (subscriber profiles), performs authentication and authorization of the user, and can provide information about the subscriber's location and IP information. Thus, the subscriber profile provided to the HSS includes IMSI number, quality of service information, APN, and other related parameters.

Thus, among other things, embodiments herein include automation of adding a subscriber profile in an HSS (or 5G core) by verifying the subscriber against the enterprise's federated identity management system and makes it easier to activate eSIM.

More specifically, in accordance with further embodiments herein, a communication management resource such as a SIM provisioning platform receives input from a mobile communication device to activate use of the mobile communication device in a private wireless network. The communication management resource first authenticates use of the mobile communication device and/or corresponding user in the first wireless network (such as private wireless network).

In one embodiment, the communication management resource (such as a SIM provisioning platform) produces SIM information for the mobile communication device in response to authentication of the mobile communication device and/or authentication of an operator of the mobile communication device. For example, subsequent to authentication, the communication management newly populates an access file such as private SIM (Subscriber Identity Module) information for use by the mobile communication device to access the private wireless network. In one embodiment, the access file (i.e., SIM information) is populated with connection information such as a unique cell identifier value, encryption information, identification of supported services, etc.

The communication management resource communicates the access file (such as SIM information) to the mobile communication device, enabling the mobile communication device use of the private wireless network. In other words, as further discussed herein, the generated SIM information (access file) communicated to the mobile communication device enables the mobile communication device use of wireless network services provided by the private wireless network, access of which is managed by the communication management resource such as SM-DP+ server (platform) or other suitable entity.

In one embodiment, the private wireless network co-exists in a public network environment accessible to the mobile communication device. Thus, the mobile communication device may be provided access to multiple different wireless networks via different SIM information.

In further example embodiments, when producing the SIM information (access file) to use the private wireless network, the communication management resource retrieves and populates the SIM information with a unique network identifier value (such as an IMSI or other suitable value). The communication management resource also creates and populates the SIM information with selected encryption information supporting secured wireless connectivity with the private wireless network.

The operator of the mobile communication device can be any suitable person or entity. In one embodiment, the operator of the mobile communication device requesting corresponding activation is an employee of an entity implementing the first wireless network. The input used to authenticate use of the mobile communication device can include any suitable information. For example, in one embodiment, the input from the mobile communication device includes personal information (name, assigned employee number, etc.) associated with the employee. The personal information enables authentication and/or subsequent activation of the mobile communication device via generation of the SIM information.

The communication management resource can be configured to receive the input (to activate use of the device to use the private wireless network) from the mobile communication device in any suitable manner. For example, in one embodiment, the mobile communication device includes a near field communication interface. The communication management resource receives the input (data) associated with the mobile communication device and/or corresponding user via one or more instances of near field communications transmitted from the mobile communication device to a near field communication interface coupled to the communication management resource. The near field communication interface communicates the input received from the mobile communication device to the communication management resource. In a reverse direction, the system can be configured to communicate data over near field communications from the interface to the mobile communication device.

Additionally, or alternatively, in order to activate the mobile communication device, the operator of the mobile communication device can be configured to establish a respective wireless communication link between the mobile communication device and a wireless base station (or wireless access point) disposed inside or outside of the private wireless network. The wireless base station forwards the input from the mobile communication device to the communication management resource.

Authentication of the mobile communication device and/or corresponding user can be achieved in any suitable manner. For example, in one embodiment, authentication of the mobile communication device includes: via the communication management resource: i) receiving personal information associated with an operator of the mobile communication device, and ii) verifying the personal information with respect to user information associated with the operator as stored in a repository. In one embodiment, the input (such as personal or other suitable information associated with the user) includes account credentials associated with use of the provide wireless network.

In further example embodiments, as previously discussed, in addition to producing an access file (such as SIM information) supplied to the mobile communication device, the communication management resource (such as SIM provisioning server or other suitable resource) as discussed herein produces device connection information (a.k.a., subscriber profile information). The device connection information (provided to a wireless connection manager) is complementary to the access file produced for use by the mobile communication device. The device connection information (i.e., subscriber profile) includes subscription-related information, enabling authentication and authorization of the user, and can provide information about the subscriber's location and IP information. Thus, the subscriber profile provided to the wireless access manager (such as HSS) may include one or more of an IMSI number, quality of service information, APN, and other related parameters assigned to the respective mobile communication device.

In yet further example embodiments, a wireless access manager associated with the private wireless network uses the device connection information (i.e. subscriber profile information) as a basis to support communications with the mobile communication device. For example, the device connection information supports connectivity of the mobile communication device to the first wireless network (such as private wireless network).

As a more specific example, the communication management resource communicates the newly generated device connection information to the wireless access manager of the private wireless network. Via the device connection information, the wireless access manager (such as HSS or other suitable resource associated with the private wireless network) controls/provides use of wireless service provided by the private wireless network to the mobile communication device.

In further example embodiments herein, subsequent to activation of a mobile communication device via distribution of the SIM information to the mobile communication device, a wireless access manager controls connectivity of the mobile communication device to the private wireless network. For example, assume that the wireless access manager receives a request from the mobile communication device to establish a respective wireless communication link with a wireless base station in the private wireless network. In response to receiving the request, the wireless access manager utilizes the device connection information (complementary information with respect to the SIM information as previously discussed) to provide the mobile communication device network access via the first wireless network.

Embodiments herein are useful over conventional techniques. For example, embodiments herein provide unique ways to provision and/or activate eSIMs such as for access to private wireless networks. The different implementations herein: i) decrease the complexity of operations such as eSIM activation and adding subscriber profiles to a respective HSS, ii) leverage the fact that private wireless network equipment is disposed on premises (such as in the private wireless network). In certain instances, embodiments herein include methods that are zero-touch provisioning as they eliminate manual entry or scan of customized QR codes.

Note that any of the resources as discussed herein can include one or more computerized devices, user equipment, wireless communication devices, gateway resources, mobile communication devices, sensors, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and/or operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to support wireless communications via generation and distribution of SIM information. The instructions, when executed by the computer processor hardware, cause the computer processor hardware (such as one or more co-located or disparately processor devices or hardware) to: receive input from a mobile communication device to activate use of the mobile communication device in a first wireless network (such as private wireless network); authenticate use of the mobile communication device in the first wireless network; produce SIM (Subscriber Identity Module) information for use by the mobile communication device to access the first wireless network; and communicate the SIM information to the mobile communication device. The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of supporting wireless communications in wireless network environment, especially in private wireless networks. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
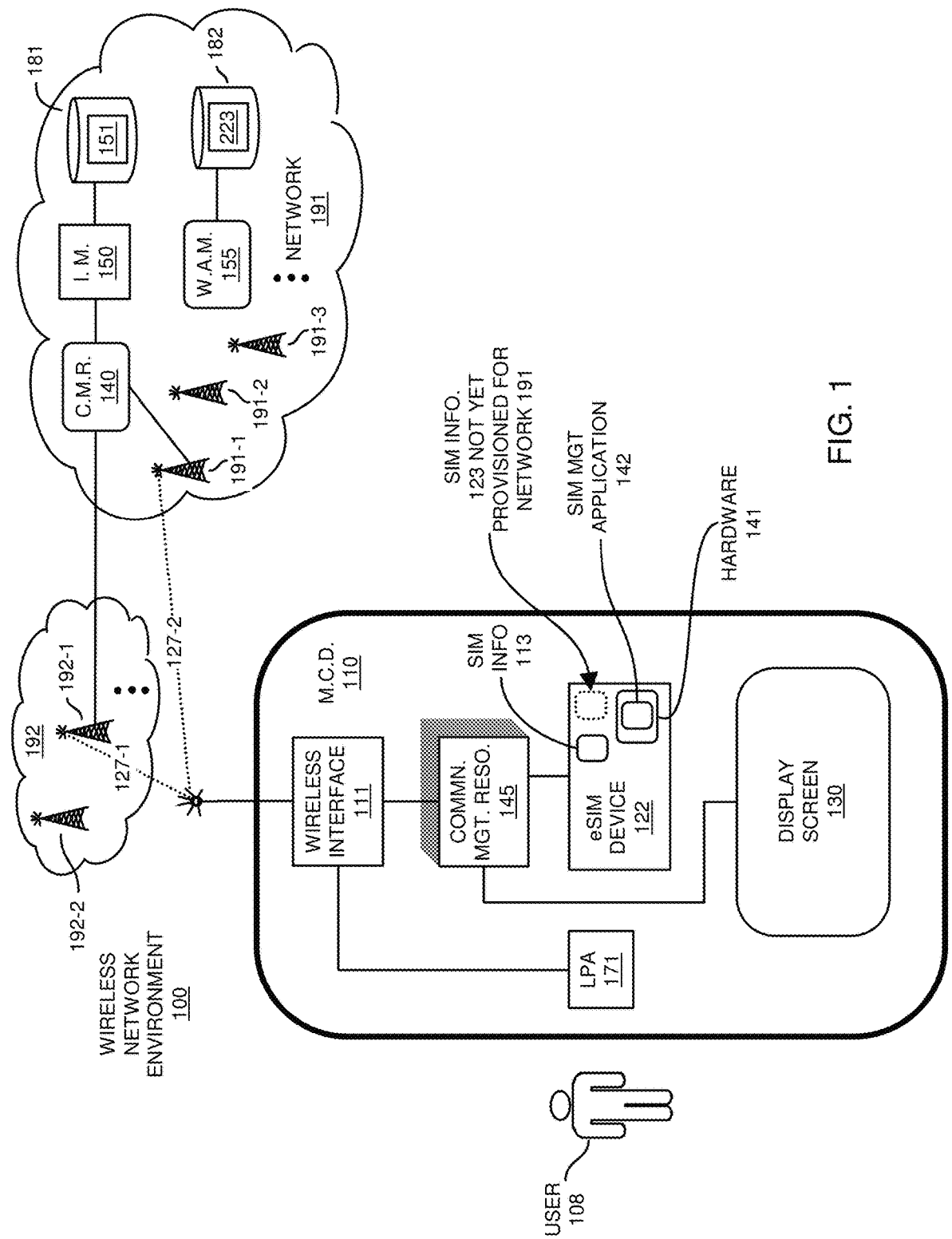
FIG. 1 is an example diagram illustrating user equipment in communication with a private wireless network or a public wireless network according to embodiments herein.

The foregoing and other objects, features, and advantages of the invention(s) will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

As previously discussed, embodiments herein include one or more techniques of provisioning SIM information (i.e., connection access information) to a respective mobile communication device. Provisioning further includes generating complementary subscriber profile information for use by an access control manager of a private wireless network to control access of the mobile communication device and use of respective wireless services.

Scan to Activate

In one implementation, for an end user to activate a device (i.e. smart phone or tablet) on a respective enterprise's private wireless network, the user turns on the device and scans information such as their enterprise (employee) badge. Once scanned, the end user (a.k.a., operator of the mobile communication device) authenticates themselves by entering their enterprise account credentials (employee ID/password) in the mobile communication device. The mobile communication device communicates this information to a SM-DP+ platform. For example, after entering their credentials, the eSIM (application) on the mobile communication device will contact the SM-DP+ on-premises platform, which in turns will verify the user's information against the company's federated management system. After completing verification, the user's information in the federated identity management system is used to populate the subscriber profile in the HSS (Home Subscriber Server) and continue with eSIM activation on the mobile communication device. For example, in one embodiment, operations include:

1.—The end user of the mobile communication device scans their badge (and corresponding images) with the mobile communication device they want to activate.

2.—The user of the mobile communication device authenticates themselves by entering their enterprise credentials or requesting an activation confirmation email.

3.—The SIM provisioning platform or communication management resource (such as SM-DP+ server) verifies the user's information against the enterprise's federated identity management system.

4.—Upon authentication, the subscriber profile generated by the communication management resource is added in HSS and eSIM profile is downloaded and provisioned on the device 5.—The mobile communication device implements an attach procedure to access services provided by the private wireless network Tap to Activate This activation method leverages the end user device's NFC. interface. The on-premises core (such as in an IDF/MDF room in case of private wireless networks) is equipped with an NFC interface module. After the mobile communication device is tapped to the NFC interface module, the end user (operator of the mobile communication device) will have to authenticate themselves by entering their enterprise account credentials (employee ID/password) and/or other information. After entering the credentials, the eSIM (application) on the mobile communication device contacts the SM-DP+ on-premises platform (through the near field communication interface), which in turns verifies the user's information against the company's federated management system. Subsequent to the verification, the user's information in the federated identity management system is used to populate the subscriber profile in the HSS and continue the eSIM activation process. For example, in one embodiment, operations include:

1. The Core/SIM provisioning server (communication management resource) on-premise of the employer's campus is equipped with an NFC module.

2. A respective users taps their eSIM equipped device (a.k.a., mobile communication device) against the NFC module associated with the core/SIM provisioning platform.

3. A respective user performs authentication by entering their enterprise credentials or requesting an activation confirmation email.

4. The SIM provisioning platform (SM-DP+ server) verifies the user's information against the enterprise's federated identity management system 5. Upon authentication, the subscriber profile generated by the SIM provisioning platform is added in HSS (private wireless network) and eSIM profile is downloaded and provisioned to the mobile communication device.

6. The device starts the normal attach procedure to use wireless services provided by the private wireless network In one embodiment, when creating/adding a subscriber profile, the HSS or other suitable entity creating the SIM information and the subscriber profile increments the current IMSI count, assigns default QoS, and APN then adds the information sent by the device. Note that the information sent by the device to create/generate the SIM information and subscriber profile may include any suitable information such as employee's ID, credentials, role, and could include other employee's information.

Now, more specifically, FIG. 1 is an example diagram illustrating user equipment in communication with a private wireless network and/or a public wireless network according to embodiments herein.

As shown in this example embodiment, the wireless network environment 100 includes mobile communication device 110 (a.k.a., user equipment) operated by user 108 (such as an employee), wireless network 191 (such as a private wireless network such as provided/operated/controlled by an employer of the employee), and wireless network 192 (such as a public wireless network). The private wireless network can be configured to support multiple employees including user 108.

Mobile communication device 110 includes wireless interface 111, communication management resource 145, so-called local profile assistant 171, eSIM device 122, and display screen 130.

The private wireless network 191 includes one or more resources such as communication management resource 140, information manager 150, repository 181, wireless access manager 155, repository 182, and multiple wireless base stations 191-1, 191-2, 191-3, etc.

Wireless network 192 (such as a public wireless network) includes one or more wireless base stations 192-1, 192-2, etc.

In one embodiment, the eSIM device 122 of mobile communication device 110 includes programmable hardware 141 to execute one or more applications. The eSIM device 122 also includes hardware storage to store subscriber information 113 (such as eSIM information providing the user access to the public wireless network 192). As further discussed herein, embodiments include generation, provisioning, and distribution of SIM information 123 to enable the mobile communication device 110 use of wireless services provided by the network 191 and corresponding wireless base stations.

Note that each of the different components such as communication management resource 140, information manager 150, wireless access manager 155, communication management resource 145, local profile assistant 171, etc., associated with or in wireless network environment 100 can be implemented via hardware, software, or a combination of both hardware and software.

More specifically, communication management resource 145 can be configured as communication management hardware, communication management software, or a combination of communication manager hardware and communication management software; SIM management application 142 can be configured as SIM management hardware, SIM management software, or a combination of SIM management hardware and SIM management software; communication management resource 140 can be configured as communication management hardware, communication management software, or a combination of communication manager hardware and communication management software; information manager 150 can be configured as information manager hardware, information manager software, or a combination of information manager hardware and information manager software; wireless access manager 155 can be configured as wireless access manager hardware, wireless access manager software, or a combination of wireless access manager hardware and wireless access manager software; and so on.

As further shown, user 108 operates corresponding mobile communication device 110. In one embodiment, as previously discussed, the user 108 is an employee associated with a corresponding company that implements or controls operation of private wireless network 191. The company operates the private wireless network 191 to provide wireless network services to the corresponding one or more mobile communication devices in network environment 100. One advantage of the private wireless network 191 and corresponding company providing wireless services is the ability to provide higher quality of service (such as higher bandwidth, lower latency wireless communications) to provide the mobile communication device 110 better access (than wireless network 192) to data from resources inside or outside of the wireless network 191.

In accordance with input from the user 108, the mobile communication device 110 (i.e., a communication device) communicates with communication management resource 140 via private wireless network 191 (such as cellular network, Wi-Fi™ network, etc.) and corresponding communication link 127-2 with one or more management resources such as communication management resource 140. Additionally, or alternatively, the mobile communication device 110 is able to communicate with the communication management resource 140 via communications over wireless communication link 127-1 and through the wireless network 192.

As its name suggests, in one embodiment, the local profile assistant 171, the communication management resource 145, and/or an application (such as SIM management application 142 executing in the eSIM device 122 of the mobile communication device 110) assists in communicating with communication management resource 140 and obtaining and downloading respective subscriber information (SIM information 123) to use the wireless network 191.

In one embodiment, the mobile communication device operated by the user 108 entity already has SIM information 113 downloaded to it. In such an instance, via the SIM information 113, the mobile communication device 110 has the ability to wirelessly connect to wireless network 192 (such as a public wireless network).

As a new employee, the mobile communication device 110 needs to communicate with the communication management resource 140 to obtain SIM information 123 supporting respective wireless services with respect to the private wireless network 192.

Note that the private wireless network 191 may allow initial connectivity such as via wireless communication link 127-2 prior to installation of the SIM information 123 on the mobile communication device 110 in order to enable the generation and installation of the SIM information 123 to the eSIM device 122 or the mobile communication device 110 in general.

As further discussed herein, and as previously discussed, embodiments herein include the mobile communication device 110 communicating with the communication management resource via any suitable communication link such as wireless communication link 127-1, wireless communication link 127-2, etc. Thus, in order to activate the mobile communication device 110, the operator of the mobile communication device 110 can be configured to establish a respective wireless communication link between the mobile communication device 110 and a wireless base station (or wireless access point) disposed inside or outside of the private wireless network 191.

To obtain the SIM information 123, the wireless base station (such as 191-1 or 192-1) initially forwards input (credentials and any suitable information) from the mobile communication device 110 to the communication management resource 140 associated with private wireless network 192. The input of respective information into the mobile communication device 110 can be prompted by a notification displayed on the display screen 130 notifying the user 108 of what information to input or what information to scan.

The communication management resource 140 (such as a SIM provisioning platform or SM-DP+ server) receives the input from the mobile communication device 110 to activate use of the mobile communication device 110 in a private wireless network 191.

To use the private wireless network 192, a mobile communication device 110 and corresponding user 108 must be provisioned appropriate SIM information enabling use of wireless services provided by the wireless network 191. For example, in one embodiment, the communication management resource 140 or other suitable entity authenticates use of the mobile communication device 110 in the private wireless network 191 such as via the input provided by the mobile communication device 110.

As further discussed herein, subsequent to authentication, the communication management resource 140 populates an access file such as SIM (Subscriber Identity Module) information 123 for use by the mobile communication device 110 to access the private wireless network 191. The access file is populated with information such as a unique cell identifier value, encryption information, identification of supported wireless services, quality of service, etc.

The communication management resource 140 communicates the access file (such as SIM information 123) to the mobile communication device 110, enabling the mobile communication device 110 subsequent use of the private wireless network 191.

Thus, subsequent to installation of the SIM information 123 on the mobile communication device 110, mobile communication device 110 and corresponding user 108 have access to use of wireless services provided by the private wireless network 191 via use of SIM information 123.

In further example embodiments, note that the wireless network 192 provides coverage in a less-than-all portion of wireless coverage provided by the private wireless network 192. In other words, the private wireless network 191 co-exists in a public wireless network environment accessible to the mobile communication device 110. The private wireless network 192 supports a smaller region of wireless coverage than a region of wireless coverage provided by the wireless network 192. One embodiment, the region of wireless coverage provided by the wireless network 191 is completely within the region of wireless coverage provided by the wireless network 192.

Via SIM information 113 and SIM information 123, the mobile communication device 110 may be simultaneously provided access to wireless network 192 and wireless network 191.

In further example embodiments, in addition to producing an access file (such as SIM information 123) supplied to the mobile communication device 110, the communication management resource 140 (such as SIM provisioning server or other suitable resource) as discussed herein also produces device connection information 223 (a.k.a., subscriber profile information). The device connection information 223 (stored in repository 182 and accessible to the wireless access manager 155) is complementary to the SIM information 123 produced for use by the mobile communication device 140. As further discussed herein, a combination of the SIM information 123 and the device connection information 223 support wireless connectivity between the mobile communication device 110 and any of one or more wireless base stations 191-1, 191-2, 191-3, etc.

The more specific process of generating the SIM information 123 and corresponding device connection information 223 is further discussed below.

Figure 2:
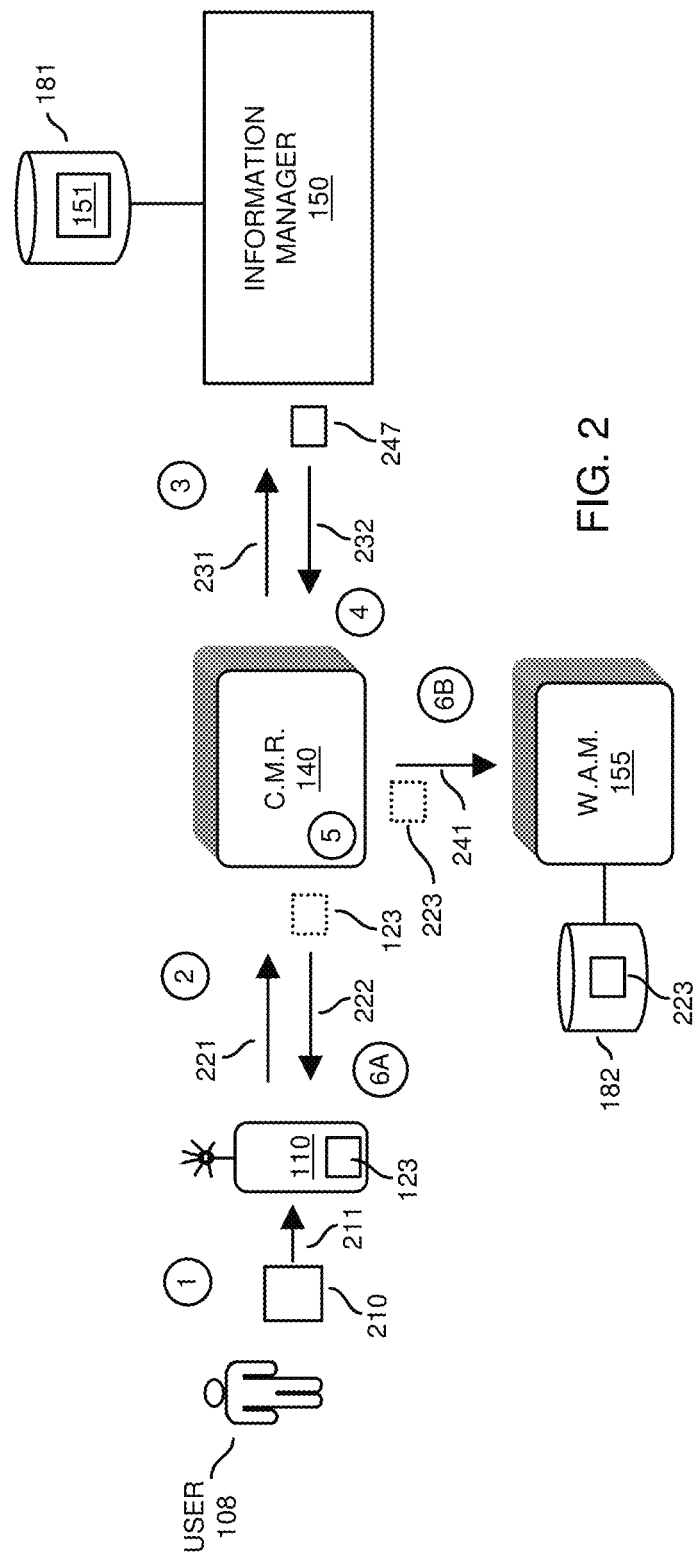
FIG. 2 is an example diagram illustrating provisioning of SIM (Subscriber Identity Module) information according to embodiments herein.

FIG. 2 is an example diagram illustrating provisioning of SIM (Subscriber Identity Module) information according to embodiments herein.

More specifically, in accordance with further embodiments herein, the mobile communication device 110 establishes wireless connectivity with the communication management resource 140 such as through wireless base station 191-1 or wireless base station 191-2 in a manner as previously discussed. Any suitable communication link can be used to process connectivity between the mobile communication device in the communication management resource 140.

In operation #1, the user 108 triggers execution of the SIM management application 141 (or other suitable entity) and corresponding operations associated with the mobile communication device 110. The mobile communication device 110 receives input 211 such as data associated with the user 108) to activate use of the mobile communication device 110 in a private wireless network 191. In one embodiment, the user 108 operates the mobile communication device 110 to scan a respective object 210 (such as a badge or other suitable entity) for images (such as QR code, numbers, letters, etc.) associated with the user 108. The input 211 includes any suitable information (scanned from an object 210 or inputted manually by the user) such as username, password, etc., inputted to the communication device 110 by the respective user 108.

In operation #2, via communications 221, the mobile communication device 110 communicates the input 211 to the communication management resource 140. Via the received input associated with the user 180 and/or mobile communication device 110, the communication management resource 140 first authenticates use of the mobile communication device 110 for use in the private wireless network 191.

As previously discussed, the operator (user 108) of the mobile communication device 110 can be any suitable person or entity. In one embodiment, the operator of the mobile communication device 110 requesting corresponding activation of the mobile communication device 110 is an employee of an entity implementing the private wireless network 191. In one embodiment, the input 211 received from the mobile communication device 110 is used to authenticate use of the mobile communication device 110 and can include any suitable information. For example, in one embodiment, the input 211 from the mobile communication device 110 may include personal information (name, assigned employee number, etc.) associated with the employee (user 108). The personal information enables activation of the mobile communication device via generation of the SIM information.

Authentication of the mobile communication device and/or corresponding user can be achieved in any suitable manner. For example, in one embodiment, via communications 231, authentication of the mobile communication device 110 and/or user 108 includes: via the communication management resource 140: i) receiving personal information associated with the user 108 of the mobile communication device 110 via communications 221, and ii) via operation #3 and corresponding communications 231 and communications 232, verifying the personal information with respect to user information associated with the operator as stored in repository 181. As previously discussed, in one embodiment, the input 211 (such as personal or other suitable information) includes account credentials associated with use of the first wireless network.

More specifically, via communications 231 and operation #3, the communication management resource 140 provides the received input from the user 108 to the information manager 150. The information manager 150 (or communication management resource 140) determines whether the mobile communication device 110 provides the appropriate credentials to be allocated to respective SIM information 123. If so, the information manager 150 accesses the configuration settings 151 stored in repository 181 for the particular user 108. In one embodiment, the configuration settings 151 indicate respective one or more wireless services that are to be allocated for use by the mobile communication device 110 corresponding user 108 when using private wireless network 191. In one embodiment, the information manager 150 maps an identity and/or level of the user 108 to configuration settings 247 (such as quality of wireless service to provide the mobile communication device 110, one or more different types of services to provide the mobile communication device 110, etc.) associated with the respective user 108

In operation #4, via communications 232, the information manager 150 communicates the configuration settings 247 associated with the respective user 108 to the communication management resource 140.

In one embodiment, based at least in part on the configuration settings 247, the communication management resource 140 (such as SIM provisioning platform) produces SIM information 123 for the mobile communication device 110 in response to authentication of the mobile communication device 110 and/or authentication of an operator (i.e., user 108) of the mobile communication device 110.

More specifically, in operation #5, subsequent to authentication of the user 108/mobile communication device 110 and receiving configuration settings 247 from the information manager 150, the communication management 140 produces SIM information 123 (i.e., access file) for use by the mobile communication device to access the private wireless network 191.

Figure 3:
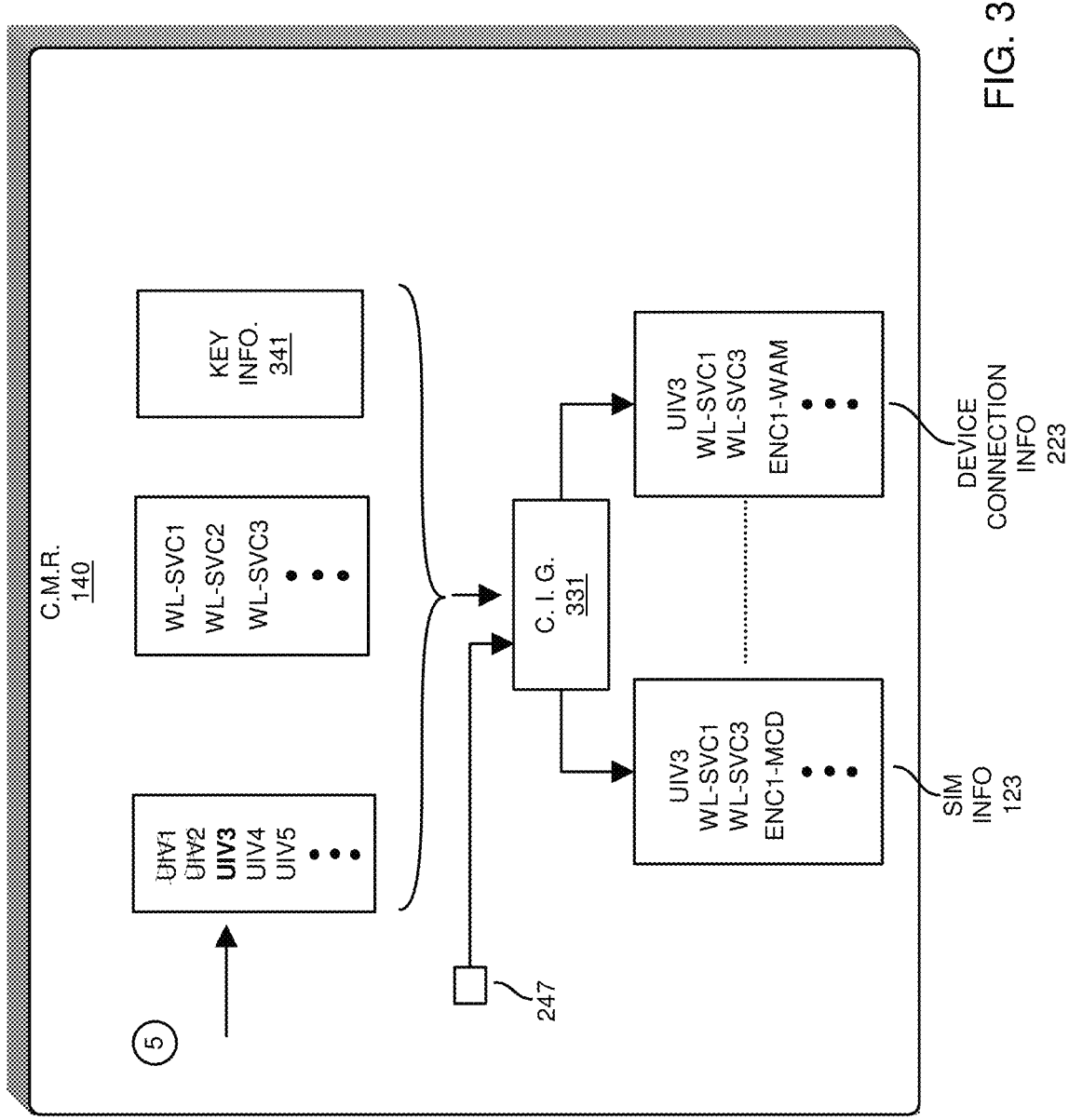
FIG. 3 is an example more detailed diagram illustrating generation of SIM information and device connection information (i.e., subscriber profile) according to embodiments herein.

A more detailed example of operation #5 is shown in FIG. 3.

FIG. 3 is an example diagram illustrating generation of SIM information and device connection information according to embodiments herein.

In this example embodiment, the communication management resource 140 includes configuration information generator 331 to generate the respective SIM information 213.

Via operation #5, in accordance with the configuration settings 247, the communication management resource 140 produces the SIM information 123 and the device connection information 223. In one embodiment as shown, the configuration information generator 331 populates the SIM information 123 and the device connection information 223.

In this example embodiment, the configuration information generator 331 of the communication management resource 140 allocates and populates the SIM information 123 (access file) with connection information such as a selected unique cell identifier value UIV3, selected or generated encryption information ENC1-MCD, identification of supported services WL-SVC1, WL-SVC3, etc.

In further example embodiments, the unique cell identifier value UIV3 is an IMSI (International Mobile Subscriber Identity) or other suitable information such as a number that uniquely identifies the user 108 and/or mobile communication device 110 of a cellular network. Via such an identifier, the wireless access manager 155 is able to route data and/or incoming calls having a destination set to the unique identifier value UIV3 from the wireless network 191 to the mobile communication device 110. In a reverse direction, via the identifier, the wireless access manager 155 is able to identify which mobile communication devices is attempting to establish a respective wireless communication link with the wireless network 191.

The encryption information ENC1-MCD in the SIM information 123 provides security and enables the mobile communication device 110 to communicate encrypted communications to the private wireless network 191. The services WL-SVC1, WL-SVC3, etc., in the SIM information 123 provides notification to the mobile communication device 110 of which services are available by via the private wireless network 191.

Thus, in one embodiment, when newly producing the SIM information 123 (access file), the communication management resource 140 (via corresponding configuration information generator 331) retrieves and populates the SIM information 123 with a unique network identifier value UIV3 (such as an IMSI or other suitable value). The communication management resource 140 (via corresponding configuration information generator 331) also creates and populates the SIM information 123 with encryption information ENC1-MCD (such as one or more encryption keys or other suitable security information) supporting secured wireless connectivity with the private wireless network.

In addition to newly producing the SIM information 123, the communication management resource 140 and corresponding configuration information generator 331 produces the device connection information 223 (i.e., subscriber profile information). For example, the configuration information generator 331 produces the device connection information 223 as complementary connection information supporting connectivity between the mobile communication device 110 and the private wireless network 191.

More specifically, in one embodiment, subsequent to authentication of the mobile communication device 110 and corresponding user 108 as well as determination that the user 108 and mobile communication device 110 should be allocated SIM information to use the wireless network 191, the configuration information generator 331 produces the device connection information 223 to include an identity (such as unique identifier value UIV3) assigned to the mobile communication device 110 as well as supported wireless services and/or appropriate encryption information ENC1-WAM assigned to communicate with the mobile communication device. In one embodiment, the encryption information ENC1-WAM (such as one or more encryption keys and/or other security information) is complementary with respect to the encryption information stored in the SIM information 123. The information ENC1-WAM allows the private wireless network 191 and corresponding resources to decrypt corresponding encrypted messages communicated by the mobile communication device 110 to the wireless access manager 155. The encryption information provided to the mobile communication device in the SIM information 123 enables the mobile communication device 123 to decrypt communications received from the private wireless network 191.

Referring again to FIG. 2, in operation #6A, and via corresponding communications 222, the communication management resource 140 communicates the newly generated SIM information 123 to the mobile communication device 110 for storage in the eSIM device 122 or other suitable location.

As previously discussed, the SIM information 123 enables the mobile communication device 110 use of the private wireless network 191. In other words, as further discussed below, the generated SIM information 123 (access file) communicated to the mobile communication device 123 enables the mobile communication device 110 and corresponding user 108 use of wireless network services provided by the private wireless network 191.

Via operation #6B, and via corresponding communications 241, the communication management resource 140 communicates the newly generated device connection information 223 (subscriber profile information associated with the mobile communication device 110) to the wireless access manager 155 for storage in the repository 182 or other suitable location.

As previously discussed, the device connection information 223 stored in repository 182 enables the wireless access manager 155 to communicate with and provide services to the mobile communication device 110.

Figure 4:
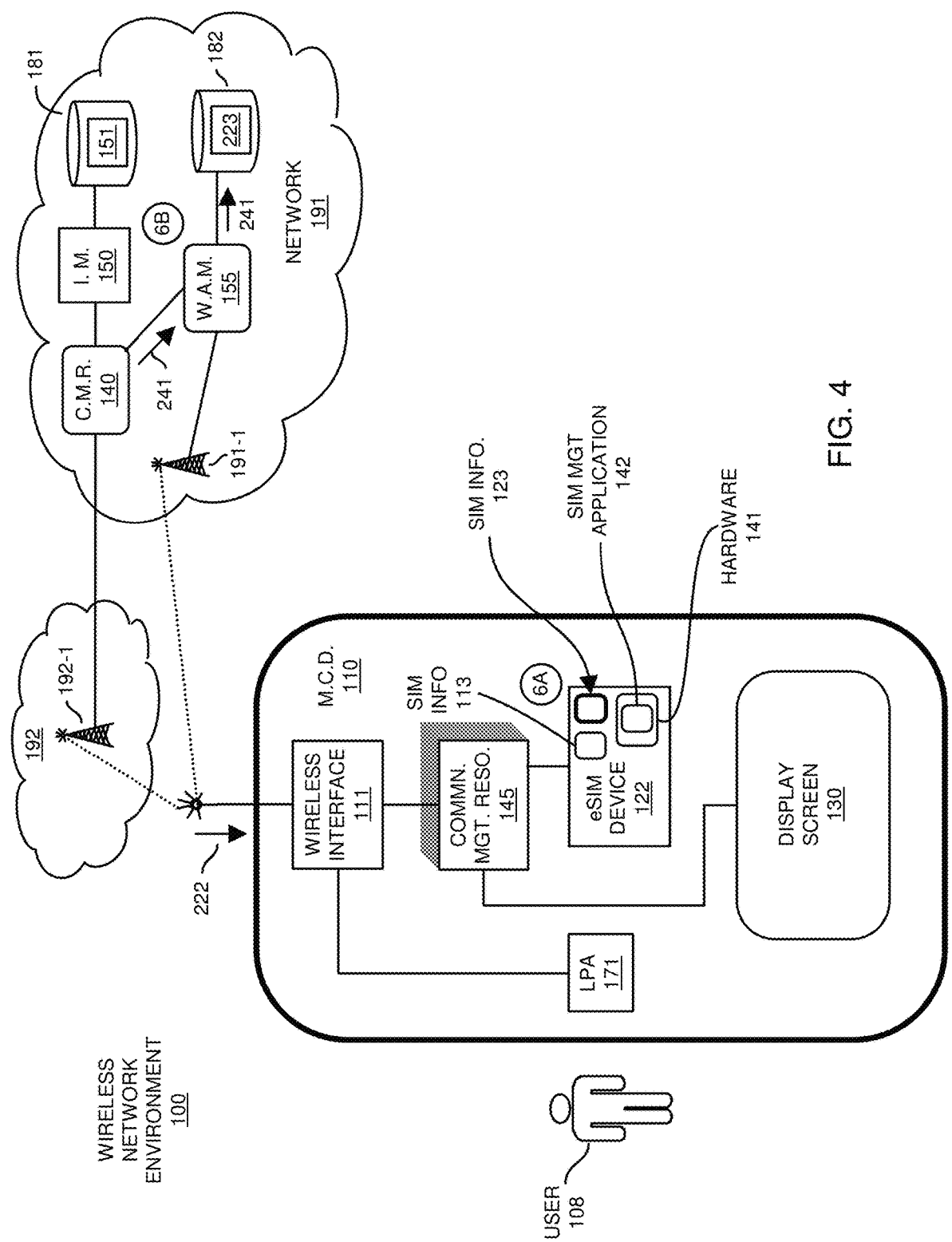
FIG. 4 is an example diagram illustrating installation of respective SIM information on a mobile communication device and storage of subscriber profile information in a network manager according to embodiments herein.

FIG. 4 is an example diagram illustrating installation of respective SIM information on a mobile communication device according to embodiments herein.

As previously discussed, via operation #6A, and via corresponding communications 222, the communication management resource 140 communicates the newly generated SIM information 123 to the mobile communication device 110 for storage in the eSIM device 122 or other suitable location.

Via operation #6B, and corresponding communications 241, the communication management resource 140 communicates the newly generated device connection information 223 to the wireless access manager 155 for storage in the repository 182 or other suitable location.

Via SIM information 113, the mobile communication device 110 is able to camp on the wireless base station 192-1 or any wireless base station in the wireless network 192. Thus, if the wireless network 192 receives an incoming call directed to the mobile communication device 110 and unique identifier value associated with the SIM information 113, the wireless base station 192-1 and corresponding wireless network 192 are able to communicate notification of the caller and/or corresponding call alert to the mobile communication device 110.

Additionally, via SIM information 123, the mobile communication device 110 is able to camp on the wireless base station 191-1 or any wireless base station in the private wireless network 191 if it is within range of such wireless base stations. If the wireless network 191 receives an incoming call directed to the mobile communication device 110 and unique identifier value associated with the SIM information 123, the wireless base station 191-1 and corresponding wireless network 191 are able to communicate notification of the caller and/or corresponding call alert to the mobile communication device 110.

Figure 5:
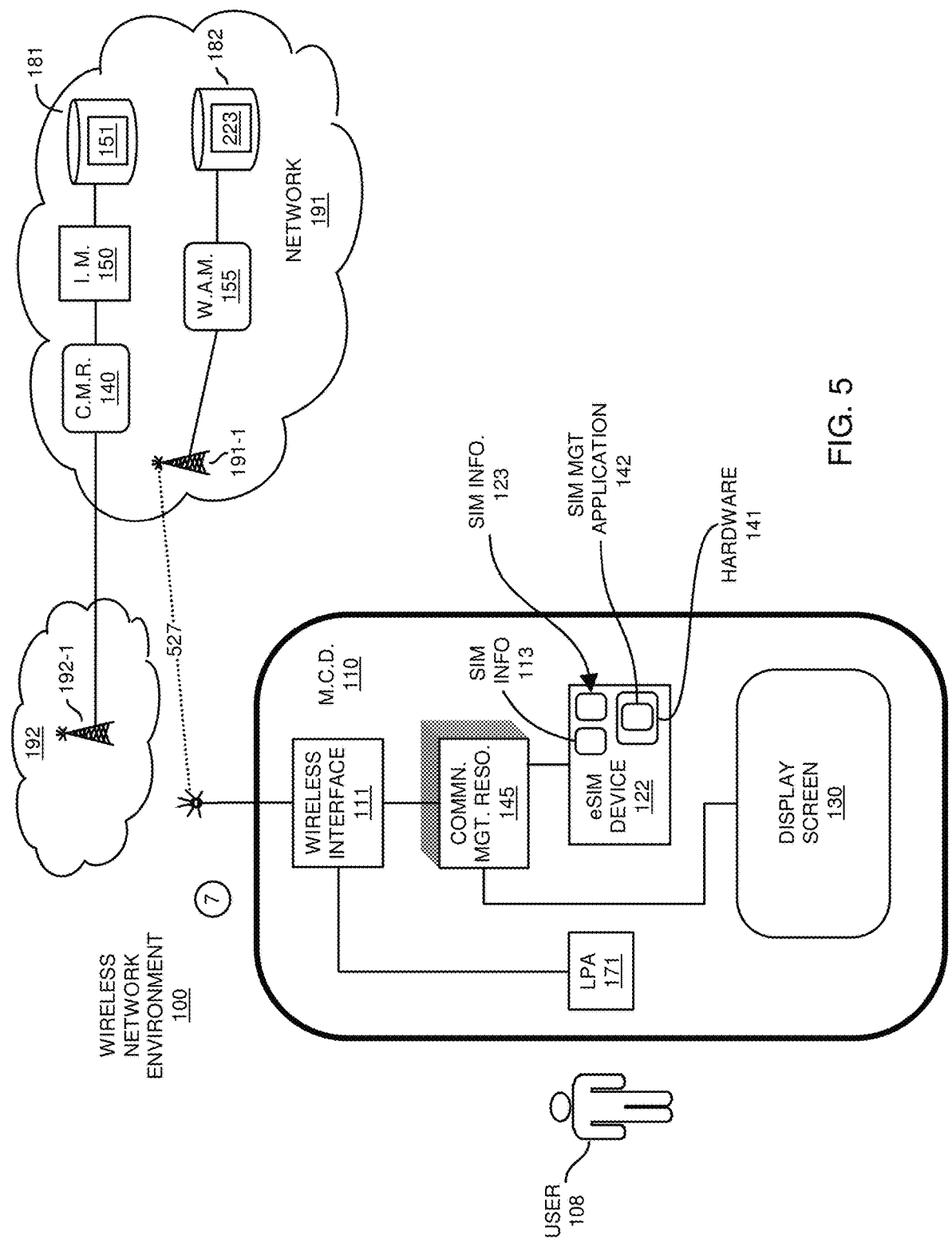
FIG. 5 is an example diagram illustrating use of SIM information to connect a mobile communication device to a private wireless network according to embodiments herein.

FIG. 5 is an example diagram illustrating use of SIM information to connect to a private wireless network according to embodiments herein.

In operation #7, the wireless access manager 155 uses the device connection information 223 as a basis to support communications with the mobile communication device 110. The mobile communication device 110 uses the SIM information 223 as a basis to support communications with the private wireless network 191.

For example, as previously discussed, the device connection information 223 supports connectivity of the mobile communication device 110 to the first wireless network (such as private wireless network). As a more specific example, the communication management resource 140 communicates the device connection information 223 to the wireless access manager 155 (such as HSS) of the private wireless network. Via the device connection information 223, the wireless access manager 155 (such as HSS or other suitable resource associated with the private wireless network) controls use of wireless services provided by the private wireless network 191 to the mobile communication device 110.

Thus, subsequent to activation of a mobile communication device 110 via distribution of the SIM information 123 to the mobile communication device 110, the wireless access manager 155 allows/controls connectivity of the mobile communication device 110 to the private wireless network 191.

For example, assume that the wireless access manager 155 receives a request from the mobile communication device 110 to establish a respective wireless communication link 527 with a wireless base station 191-1 in the private wireless network 191. In one embodiment, the mobile communication device 110 uses the SIM information 123 to communicate with the private wireless network 191. The wireless access manager 155 utilizes the device connection information 223 (complementary information with respect to the SIM information 123 as previously discussed) to provide the mobile communication device 110 network access. Subsequent to completion of establishing the newly requested wireless communication link 527, the mobile communication device 110 is provided wireless services as indicated by the SIM information 123.

Note again that embodiments herein are useful over conventional techniques. For example, embodiments herein provide unique ways to provision and/or activate eSIMs such as for access to private wireless networks. The different implementations herein: i) decrease the complexity of operations such as eSIM activation/generation/distribution and adding a respective subscriber profile to a respective wireless access manager 155 (such as HSS), ii) leverage the fact that private wireless network equipment is disposed on premises (such as a campus of the employer). In certain instances, embodiments herein include methods that are zero-touch provisioning as they eliminate manual entry or scan of customized QR codes to configure a respective mobile communication device 110 and corresponding network 191 to support wireless connectivity.

Figure 6:
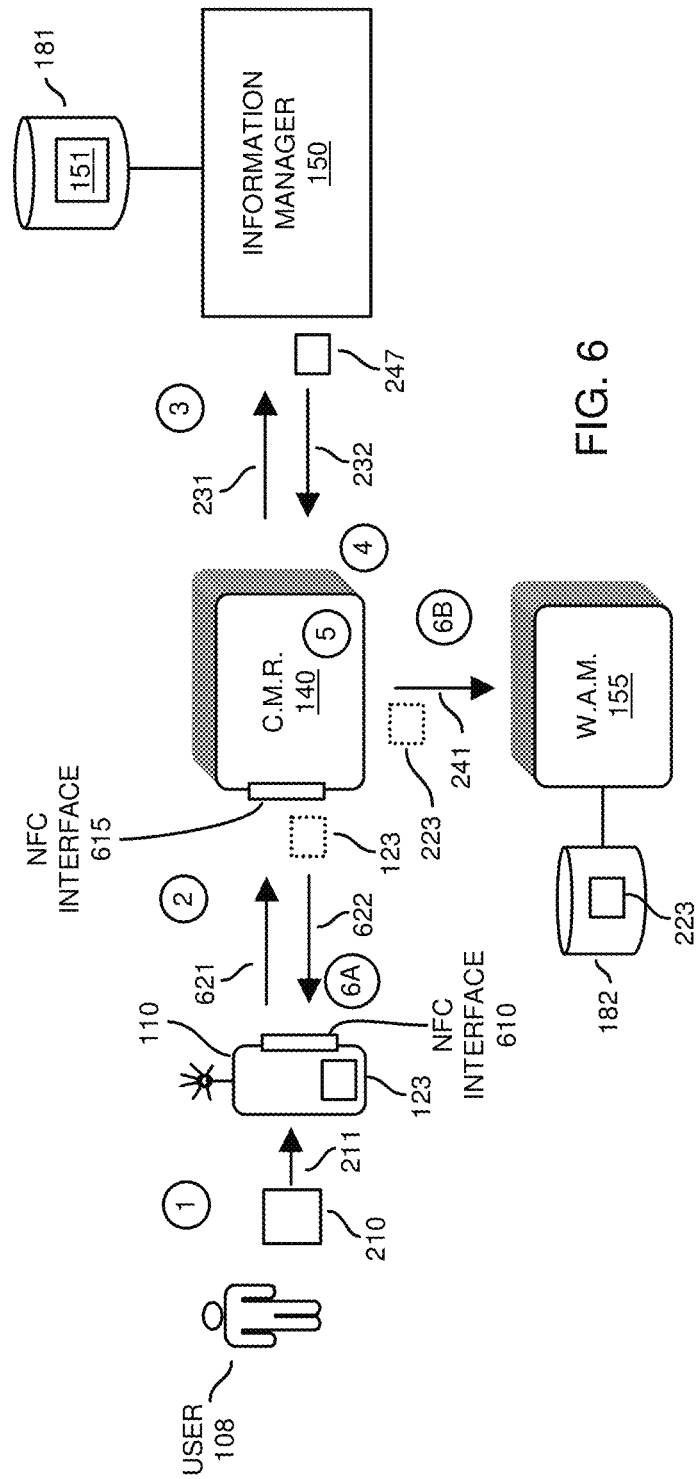
FIG. 6 example diagram illustrating implementation of a near field communication link to initiate retrieval of SIM information to access a private wireless network according to embodiments herein.

FIG. 6 example diagram illustrating implementation of near field communications to initiate retrieval of SIM information to access a private wireless network according to embodiments herein.

Note that the communication management resource 140 can be configured to receive the input (to activate use of the device to use the private wireless network) from the mobile communication device 110 in any suitable manner. For example, in this embodiment, the mobile communication device 110 is equipped with an NFC (near field communication) interface 610.

Via communications 621, the communication management resource 140 receives the input 211 (such as data associated with the user 108 and/or mobile communication device 110) via one or more instances of near field communications transmitted from the NFC interface 610 of the mobile communication device 110 to a near field communication interface 615 associated with the communication management resource 140. The near field communication interference 615 communicates the input received from the mobile communication device to the communication management resource 140. In a reverse direction, the communication management resource 140) or other suitable entity can be configured to communicate data over near field communications from the interference 615 to the interface 610 of the mobile communication device 110.

Thus, operations in FIG. 6 are the same as previously discussed with respect to FIG. 2 except the connectivity between the mobile communication device and the communication management resource is based on near field communications. Thus, any suitable communication link can be implemented to initiate generation and installation of the SIM information 123 onto the mobile communication device 110 as well as generation and installation of the device connection information 223 to the wireless access manager 155.

Figure 7:
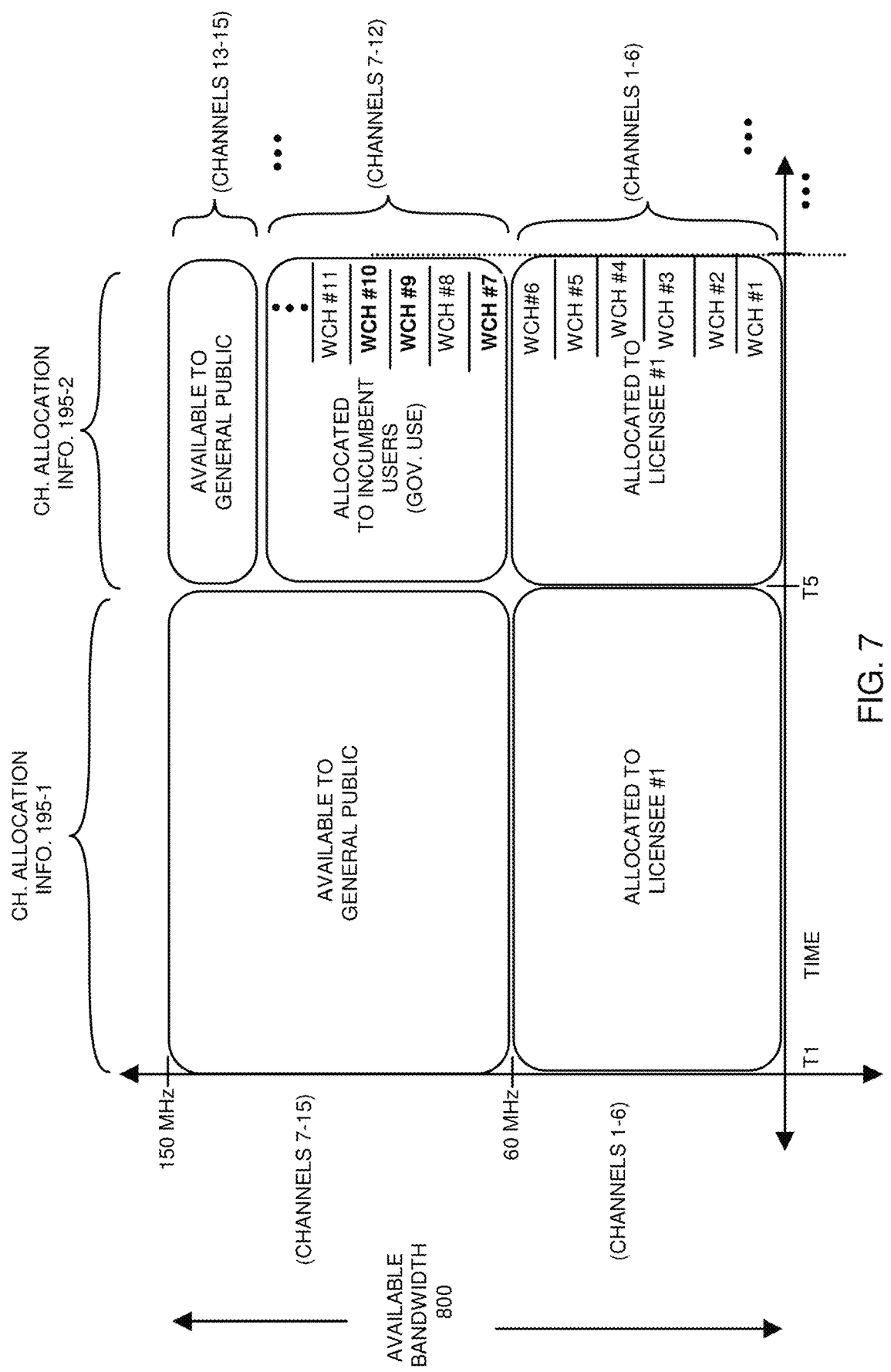
FIG. 7 is an example diagram illustrating a band supporting wireless connectivity according to embodiments herein.

FIG. 7 is an example diagram illustrating generation of dynamic channel allocation information indicating allocation of bandwidth at different tiers of a channel hierarchy according to embodiments herein.

As previously discussed, wireless access manager 155 can be configured to allocate any suitable type of wireless spectrum (bandwidth, wireless channels, shared wireless channels, etc.) for use by the wireless base stations and customer premises equipment in the network environment 100.

In one non-limiting example embodiment, the wireless access manager 155 allocates bandwidth (to support the wireless communication link 527 between the mobile communication device 110 and the wireless network 191) from a so-called CBRS (Citizens Band Radio System) band (shared spectrum) operating between 3.550 and 3.700 GHz (GigaHertz) (such as 150 MegaHertz or 15 wireless channels that are each 10 MHz wide).

Also, as previously discussed, communication management resource 140 (such as spectrum access system, allocation management resource, or other suitable entity) keeps track, at any given time, which wireless channels or portions of the multi-tier shared wireless spectrum or multi-tier radio band (such as CBRS band) are available in the geographical region in which the network environment 100 resides. If government use (a so-called incumbent user) is detected or requested via appropriate input (such as around time T5) to an allocation management resource such as spectrum access system monitoring use of wireless channels, certain channels are no longer available for use as shown in the channel access information 195-2 as shown in FIG. 5.

More specifically, in this example, the channel availability information 195-1 (a first instance of allocation information 195) indicates that prior to time T5, channels 7-15 are available to the general authorized access users (general public or low priority users) for use; channels 1-6 are available for use by licensee #1. In a manner as previously discussed, one or more of the available channels 1-15 are allocated for use by one or more of the wireless base stations (such as 191-1, 191-2, 191-3, etc.) in network environment such as private wireless network 191 to support wireless communication links such as communication link 527 in a manner as previously discussed.

Further, as previously discussed, the wireless base station 191-1 provides wireless connectivity (such as wireless communication link 527) to the mobile communication device 110. For example, prior to time T5, the communication management resource 140 allocates use of one or more of wireless channels #1-15 to the wireless base station 191-1 and mobile communication device 110 to provide the mobile communication device 110 access to a remote network through the wireless network 191. During operation, the wireless base station 191-1 receives communications from the mobile communication device 110 in an uplink direction and forwards them to one or more resources inside or outside of private wireless network 191. In a downlink direction, the wireless base station 191-1 receives communications from a remote network and wirelessly forwards the received communications to the communication device 110 in a respective downlink over the communication link 527 (See FIG. 5).

As further shown, at or around time T5, assume that the wireless access manager 155 (or other entity such as a spectrum access system supporting allocation of wireless channels to the wireless access manager 155) receives input indicating use of a portion (channels 7-12) of the spectrum by an incumbent user such as the government. In such an instance, the allocation management resource (such as spectrum access system) updates the channel availability information such that the channel allocation information 195-2 indicates that only channels 1-7 and 13-15 are available to the licensed and general authorized access users; channels 7-12 are assigned for use by an incumbent entity requesting use or actually using the channels. Thus, after time T5, the wireless channels 7-12 are no longer available for use by the lower priority users (i.e., general authorized access users). The wireless access manager 155 revokes/discontinues use of any wireless channels that have been revoked.

In one embodiment, in response to revocation of the allocation of wireless channels 7-12, the allocation management resource notifies wireless access manager 155 and/or wireless base station 191-1 that one or more of wireless channels 7-12 are no longer available for use.

Thus, between time Ti and time T5, the wireless base station 191 uses one or more allocated wireless channels to provide the mobile communication device 110 connectivity to the private wireless network 191. At or around time T5, a spectrum access system revokes/deallocates use of the previously allocated one or more wireless channels from the wireless base station 191-1 in favor of use of the wireless channel by the incumbent user after time T5.

This illustrates the dynamic availability of different wireless channels bandwidth in a hierarchy as shared in network environment 100. For example, if an allocation management resource such as a spectrum access system allocates use of wireless channels #7-12 in the hierarchy of available channels to any of one or more wireless base stations, then the allocation management resource must de-allocate use of such wireless channels during conditions in which a higher priority so-called incumbent user relinquishes use of wireless channels 7-12 at or around time T5. In such an instance, as previously discussed, the communication management resource 140 deallocates the wireless channels 7-12 from respective wireless stations for use instead by the incumbent user (higher priority user). Thus, any of one or more wireless channels may be allocated for use by the wireless base station 191-1 to communicate with the mobile communication device 110 (or any other mobile communication device associated with the private wireless network 191). In response to can detecting a respective condition in which the allocated one or more wireless channels is used by an incumbent entity, the allocation management resource and wireless access manager 155 revokes use of one or more of the wireless channels by the wireless base station 191-1 to communicate with the mobile communication device 110 or other mobile communication devices.

Figure 8:
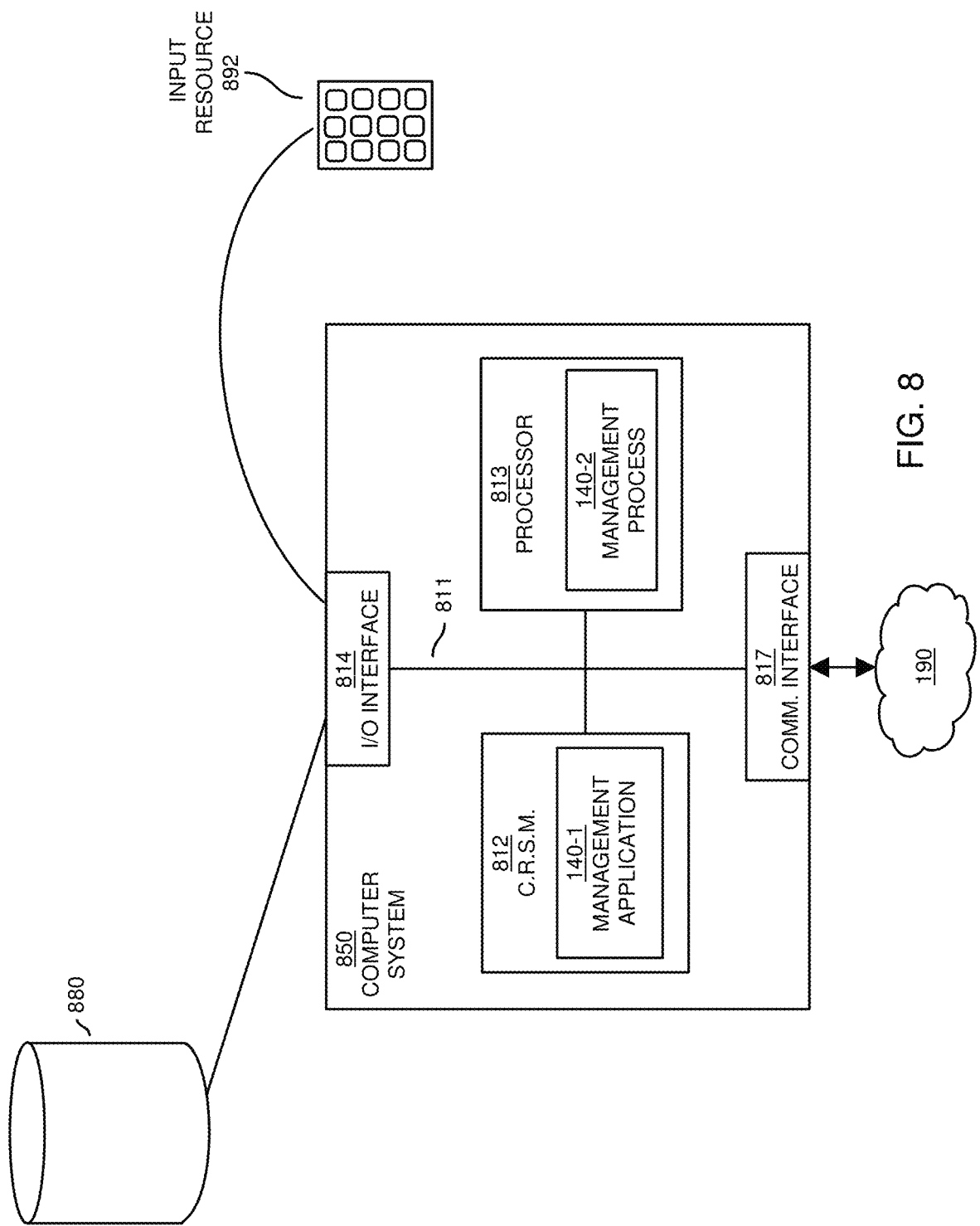
FIG. 8 is an example diagram illustrating example computer architecture operable to execute one or more operations according to embodiments herein.

FIG. 8 is an example block diagram of a computer system for implementing any of the operations as previously discussed according to embodiments herein.

Any of the resources (such as each of one or more wireless communication devices, communication management resource 195, wireless access manager, etc.) as discussed herein can be configured to include computer processor hardware and/or corresponding executable (software) instructions to carry out the different operations as discussed herein.

As shown, computer system 850 of the present example includes an interconnect 811 coupling computer readable storage media 812 such as a non-transitory type of media (which can be any suitable type of hardware storage medium in which digital information can be stored and retrieved), a processor 813 (computer processor hardware), I/O interface 814, and a communications interface 817.

I/O interface(s) 814 supports connectivity to repository 880 and input resource 892.

Computer readable storage medium 812 can be any hardware storage device such as memory, optical storage, hard drive, floppy disk, etc. In one embodiment, the computer readable storage medium 812 stores instructions and/or data.

As shown, computer readable storage media 812 can be encoded with management application 140-1 (e.g., including instructions) to carry out any of the operations as discussed herein.

During operation of one embodiment, processor 813 accesses computer readable storage media 812 via the use of interconnect 811 in order to launch, run, execute, interpret or otherwise perform the instructions in in the management application 140-1 stored on computer readable storage medium 812. Execution of the management application 140-1 produces management process 140-2 to carry out any of the operations and/or processes as discussed herein.

Those skilled in the art will understand that the computer system 850 can include other processes and/or software and hardware components, such as an operating system that controls allocation and use of hardware resources to execute management application 140-1.

In accordance with different embodiments, note that computer system may reside in any of various types of devices, including, but not limited to, a mobile computer, wireless communication device, gateway resource, communication management resource, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 850 may reside at any location or can be included in any suitable resource in any network environment to implement functionality as discussed herein.

Functionality supported by the different resources will now be discussed via flowchart in FIG. 9. Note that the steps in the flowcharts below can be executed in any suitable order.

Figure 9:
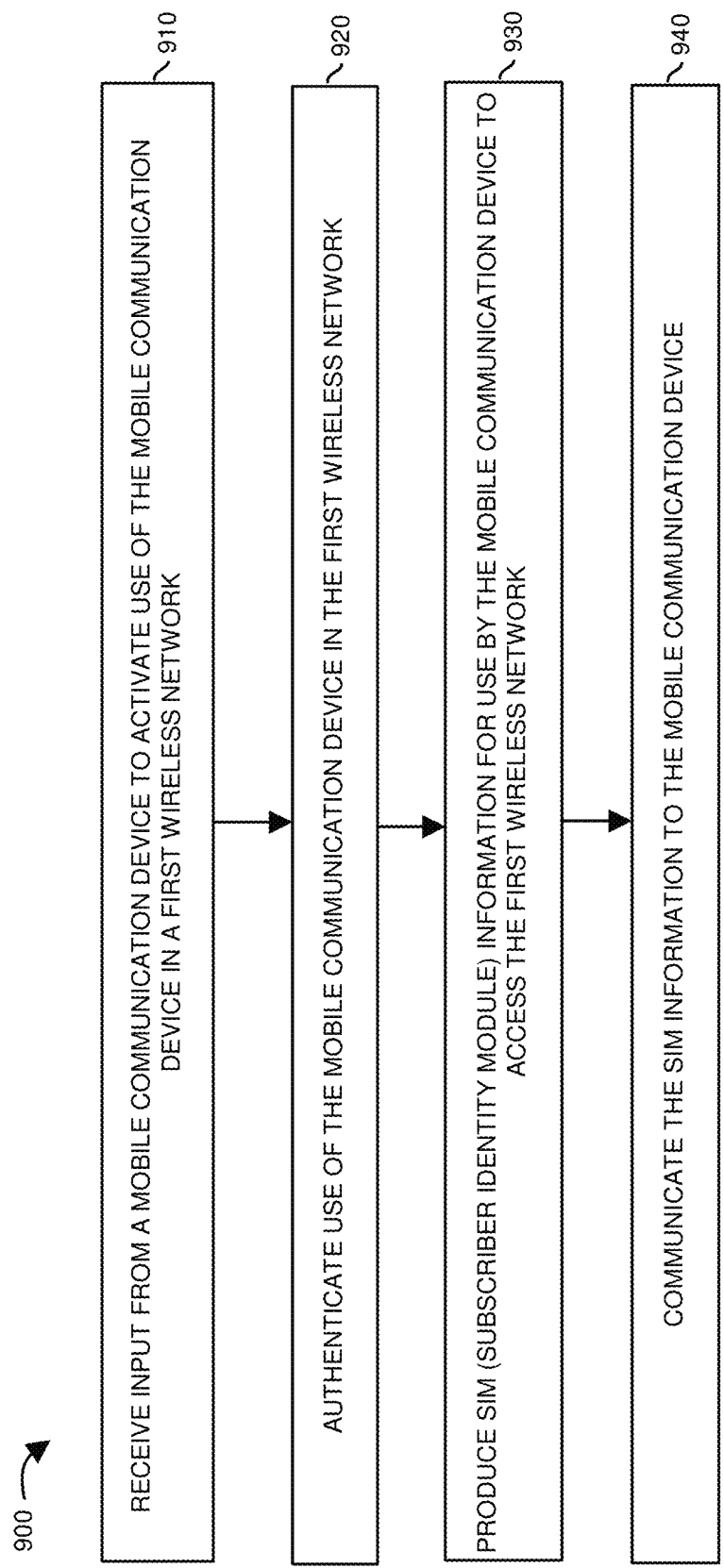
FIG. 9 is an example diagram illustrating a method according to embodiments herein.

FIG. 9 is a flowchart 900 illustrating an example method according to embodiments herein. Note that there will be some overlap with respect to concepts as discussed above.

In processing operation 910, the communication management resource 140 receives input 211 from a mobile communication device 110 to activate use of the mobile communication device 110 in a wireless network 191.

In processing operation 920, the communication management resource 140 authenticates use of the mobile communication device 110 in the wireless network 191 (such as private wireless network).

In processing operation 930, the communication management resource 140 produces SIM (Subscriber Identity Module) information 123 for use by the mobile communication device 110 to access the wireless network 191.

In processing operation 940, the communication management resource 140 communicates the SIM information 123 to the mobile communication device 110.

Note again that techniques herein are well suited to facilitate wireless communications in a wireless network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   receiving input from a mobile communication device to activate use of the mobile communication device in a first wireless network;
   authenticating the use of the mobile communication device in the first wireless network;
   producing first SIM (Subscriber Identity Module) information for use by the mobile communication device to access the first wireless network; and
   producing the first SIM information to include a unique identifier value assigned to the mobile communication device;
   producing the first SIM information to include first encryption information:
   communicating the first SIM information to the mobile communication device, the first SIM information being supplemental with respect to second SIM information stored on the mobile communication device, the second SIM information operative to provide the mobile communication device wireless network access via a second wireless network;
   the method further comprising:
   producing device connection information to include the unique identifier value, the device connection information supporting connectivity of the mobile communication device to the first wireless network;
   producing the device connection information to include second encryption information; and
   wherein implementation of the first SIM information by the communication device and implementation of the second encryption information by the first wireless network supports encrypted communications between the mobile communication device and the first wireless network.

2. The method as in claim 1 further comprising:
   communicating the device connection information to a communication management resource of the first wireless network, the communication management resource controlling wireless access of the mobile communication device with respect to the first wireless network via the device connection information.

3. The method as in claim 2 further comprising:
receiving a request from the mobile communication device to establish a respective wireless communication link with a wireless base station in the first wireless network; and
in response to receiving the request, utilizing the device connection information to provide the mobile communication device network access via the first wireless network.

4. The method as in claim 1, wherein an operator of the mobile communication device is an employee of an entity implementing the first wireless network.

5. The method as in claim 4, wherein the input includes personal information associated with the employee, the input used to authenticate use of the mobile communication device.

6. The method as in claim 1, wherein the first wireless network is a private wireless network, the private wireless network co-existing in a public network environment accessible to the mobile communication device.

7. The method as in claim 1 further comprising:
receiving the input via near field communications transmitted from the mobile communication device.

8. The method as in claim 1, wherein authenticating use of the mobile communication device includes:
receiving personal information associated with an operator of the mobile communication device; and
verifying the personal information with respect to user information stored in a repository.

9. The method as in claim 1 further comprising:
producing the first SIM information in response to authentication of an operator of the mobile communication device.

10. The method as in claim 1, wherein the input includes account credentials associated with the use of the first wireless network.

11. The method as in claim 1, wherein the first SIM information provides the mobile communication device a higher quality of service than the second SIM information.

12. The method as in claim 11, wherein the first wireless network provides overlapping wireless coverage with respect to the second wireless network.

13. The method as in claim 1, wherein producing the first SIM information further includes:
mapping an identity of a user operating the mobile communication device to configuration settings, the configuration settings indicating first wireless services to provide to the mobile communication device via the first wireless network.

14. The method as in claim 13, wherein producing the first SIM information further includes: producing the first SIM information to indicate the first wireless services as specified by the configuration settings.

15. The method as in claim 14 further comprising:
providing the device connection information to a wireless access manager associated with the first wireless network.

16. The method as in claim 15 further comprising:
at the wireless access manager, receiving a request from the mobile communication device to establish a respective wireless communication link with a wireless base station in the first wireless network; and
in response to receiving the request, utilizing the device connection information to provide the mobile communication device network access via the first wireless network.

17. A system comprising:
communication management hardware operative to:
receive input from a mobile communication device to activate use of the mobile communication device in a first wireless network;
authenticate the use of the mobile communication device in the first wireless network;
produce first SIM (Subscriber Identity Module) information for use by the mobile communication device to access the first wireless network; and
produce the first SIM information to include a unique identifier value assigned to the mobile communication device;
produce the first SIM information to include first encryption information;
communicate the first SIM information to the mobile communication device, the first SIM information being supplemental with respect to second SIM information stored on the mobile communication device, the second SIM information operative to provide the mobile communication device wireless network access via a second wireless network;
the communication management hardware further operative to:
produce device connection information to include the unique identifier value, the device connection information supporting connectivity of the mobile communication device to the first wireless network;
produce the device connection information to include second encryption information; and
wherein implementation of the first SIM information by the communication device and implementation of the second encryption information by the first wireless network supports encrypted communications between the mobile communication device and the first wireless network.

18. The system as in claim 17, wherein the communication management hardware is further operative to:
communicate the device connection information to a communication management resource of the first wireless network, the communication management resource controlling wireless access of the mobile communication device with respect to the first wireless network via the device connection information.

19. The system as in claim 18, wherein the communication management hardware is further operative to:
receive a request from the mobile communication device to establish a respective wireless communication link with a wireless base station in the first wireless network; and
in response to receiving the request, utilize the device connection information to provide the mobile communication device network access via the first wireless network.

20. The system as in claim 17, wherein an operator of the mobile communication device is an employee of an entity implementing the first wireless network.

21. The system as in claim 20, wherein the input includes personal information associated with the employee, the input used to authenticate use of the mobile communication device.

22. The system as in claim 17, wherein the first wireless network is a private wireless network, the private wireless network co-existing in a public network environment accessible to the mobile communication device.

23. The system as in claim 17, wherein the communication management hardware is further operative to:
receive the input via near field communications transmitted from the mobile communication device.

24. The system as in claim 17, wherein the communication management hardware is further operative to:
receive personal information associated with an operator of the mobile communication device; and
verify the personal information with respect to user information stored in a repository.

25. The system as in claim 17, wherein the communication management hardware is further operative to:
produce the first SIM information in response to authentication of an operator of the mobile communication device.

26. The system as in claim 17, wherein the input includes account credentials associated with the use of the first wireless network.

27. Computer-readable storage hardware having instructions stored thereon, the instructions, when carried out by computer processor hardware, cause the computer processor hardware to:
receive input from a mobile communication device to activate use of the mobile communication device in a first wireless network;
authenticate the use of the mobile communication device in the first wireless network;
produce first SIM (Subscriber Identity Module) information for use by the mobile communication device to access the first wireless network;
produce the first SIM information to include a unique identifier value assigned to the mobile communication device;
produce the first SIM information to include first encryption information:
communicate the first SIM information to the mobile communication device, the first SIM information being supplemental with respect to second SIM information stored on the mobile communication device, the second SIM information operative to provide the mobile communication device wireless network access via a second wireless network;
the computer processor hardware further operative to:
produce device connection information to include the unique identifier value, the device connection information supporting connectivity of the mobile communication device to the first wireless network;
produce the device connection information to include a second encryption information; and
wherein implementation of the first SIM information by the communication device and implementation of the second encryption information by the first wireless network supports encrypted communications between the mobile communication device and the first wireless network.

28. The method as in claim 1, receiving configuration settings assigned to a user operating the communication device, the configuration settings indicating wireless services to provide to the communication device;
producing the first SIM information to indicate the wireless services as specified by the configuration settings; and
producing the device connection information to indicate the wireless services specified by the configuration settings.

* * * * *

UNITED STATES PATENT AND TRADEMARK OFFICE
CERTIFICATE OF CORRECTION

PATENT NO. : 12,279,112 B2  
APPLICATION NO. : 17/572118  
DATED : April 15, 2025  
INVENTOR(S) : Mohamed Daoud et al.

Page 1 of 1

It is certified that error appears in the above-identified patent and that said Letters Patent is hereby corrected as shown below:

In the Claims

Column 20, Claim 1, Line 14, replace ":" with --;--

Signed and Sealed this  
Third Day of June, 2025

Coke Morgan Stewart  
*Acting Director of the United States Patent and Trademark Office*